Feb. 4, 1969  D. A. ANDERSEN  3,425,427
WHEEL WASHER
Filed Feb. 9, 1966
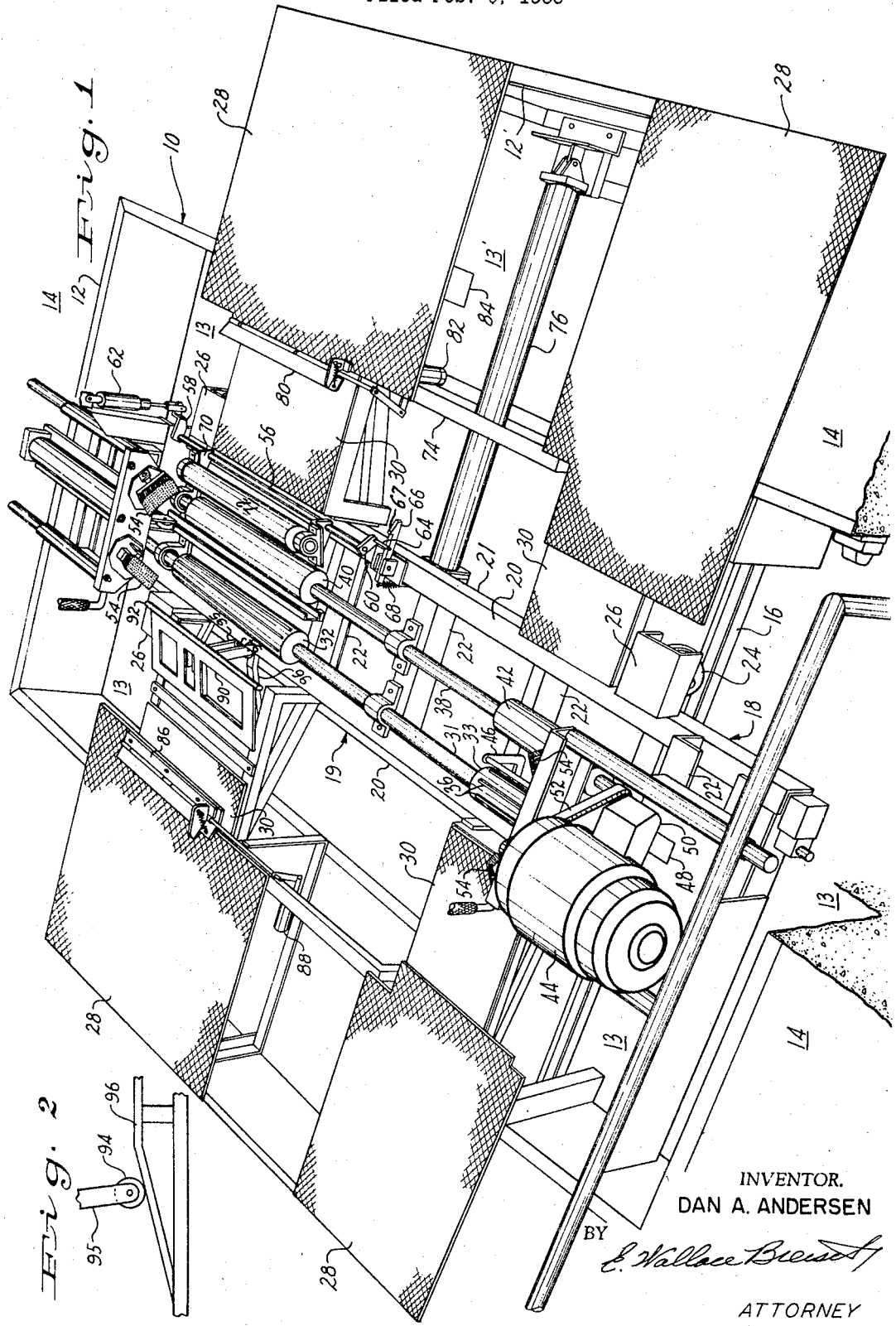
INVENTOR.
DAN A. ANDERSEN
BY
E. Wallace Breisch
ATTORNEY 3,425,427
WHEEL WASHER
Dan A. Andersen, 818 Vineyard Ave.,
Duarte, Calif. 91010
Filed Feb. 9, 1966, Ser. No. 526,229
U.S. Cl. 134—6                                        9 Claims
Int. Cl. B08b 1/00; B60s 3/00; A46b 13/04

ABSTRACT OF THE DISCLOSURE

A device and method for receiving, locating, revolving and brushing a pair of wheels at one end of an automobile while simultaneously supplying water and detergent thereto to effect complete and rapid cleaning of the pair of wheels.

---

Wheel washers providing a pair of support and drive rollers for each of the wheels at one end of an automobile vehicle are well known in the prior art. It is also well known to mount the support and drive rollers on a common carriage, forwardly movable to propel the automobile in a forward direction while washing the wheels.

The device and method of the present invention, provide for pre-start pressurization of the carriage actuating cylinder and an air actuated entrance roller so that when the pair of wheels enters upon the drive and support rollers the carriage immediately begins to move without interrupting the desired steady progress of the automobile. The device and method of this invention further provide that an exit stop roller or bumper which is automatically lowered at the end of carriage travel so that the automobile wheels contacting an exit ramp move off the drive and support rollers and thereafter contacting a return trip rod actuate a valve to return the carriage to the start position. It is to be noted that with the provision of he entrance roller and the exit stop roller, the lateral spacing of the drive and support rollers from each other can be greatly reduced as compared to such spacing of the rollers of the prior art since spacing of the drive and support rollers sufficiently far apart to allow the automobile wheel to extend downwardly therebetween for the purpose of preventing the car wheel from rising out of the rollers as it is rotated is unnecessary. The close spacing of the drive and support rollers of this invention renders the device much more adaptable to a range of wheel sizes and makes it much easier to cause the automobile wheels to exit from the drive and support rollers when such exit action is desired.

The objects and advantages of the wheel washing device of this invention will be more readily understood and appreciated upon consideration of the following description and drawing in which;

FIG. 1 is a perspective view of the device of this invention with some of the cover plates removed to permit a better view of the device;

FIG. 2 is a fragmentary elevational view of the camming portion of the device of FIG. 1.

In FIG. 1 there is shown a wheel washing device constructed according to the principles of this invention, generally indicated at 10 and comprising a generally rectangular angle iron frame 12 located in a pit 13 formed in the floor 14 (usually concrete) of a car washing installation. The frame 12 surrounds, supports, and protects those portions of the wheel washer 10 located below the level of the floor 14. Extending across the floor of the pit 13 from right to left as viewed in FIG. 1 is a pair of carriage supporting rails 16 (only one of which is shown) laterally spaced apart and rigidly secured to the frame 12 to support a wheel washing carriage generally indicated at 18 and comprising a generally rectangular frame 19 made up of longitudinal angle iron members 20 rigidly connected together by a plurality of cross members 22. The frame 19 is mounted upon and supported by four rollers 24 rotatably mounted in inverted channel iron brackets 26 extending outwardly from, and rigidly secured to, the frame 19 so that the carriage 18 is movably supported upon the rails 16 for movement forwardly and rearwardly (to the left and to the right respectively as viewed in FIG. 1) in relation to the frame 12 and the floor 14.

Four floor plates 28 resting upon the floor 14, rigidly secured to the frame 12 and extending out over portions of the pit 13 are spaced apart to receive and provide support for a pair of automobile wheels at one end of the vehicle as it approaches the washer 10 from the right and as it leaves the washer 10 in a forward direction to the left as viewed in FIG. 1. Four tread plates 30 similarly positioned extending outwardly, forwardly and rearwardly respectively, from frame 19 and supported thereby are slidably received under the floor plates 28 so that as the carriage 18 is moved forwardly and rearwardly, as hereinafter described, the portions of the pit 13 in the path of the automobile wheels will be covered and no gaps in the pathway allowed to develop.

Suitably journaled in bearings supported by cross members 22 to rotate about a horizontal axis parallel to the longitudinal members 20 is a shaft 31 having mounted thereon and rotatable therewith a pair of elongated cylindrical drive rollers 32 and 33 (right and left hand, respectively) axially spaced apart by a distance substantially less than the tread width of any popular make of car so that the rollers 32 and 33 contact the two front or two rear wheels, respectively, of any automobile regardless of variations in tread width. The rollers 32 and 33 are provided with outwardly extending means such as axially extending ridges 36 on the exterior surfaces thereof to increase frictional contact with the car wheels in providing rotation thereto. A second shaft 38 similarly mounted to rotate about an axis parallel to the axis of shaft 31 in a common horizontal plane therewith has mounted thereon two rollers 40 and 42 (right hand and left hand, respectively) similar to the rollers 32 and 33 and similarly spaced along the shaft 38. The roller 40 is aligned with and rearwardly spaced from the roller 32 such that the spacing between rollers 32 and 40 will support an automobile wheel held in an upright position with the axis thereof substantially parallel to the axes of the rollers 32 and 40 with only a very small amount of the tread of the tire mounted on the wheel extending down into the space between the rollers 32 and 40. The relative positioning and spacing of the rollers 33 and 42 is similar to that above described for the rollers 32 and 40 but having extending upwardly therebetween a trip bar member 46 of generally inverted U-shape pivotably mounted in a position to be depressed whenever an automobile wheel is supported by the rollers 33 and 42. The trip bar 46 is mechanically connected to an air valve 48 and an electrical switch 50 in such a manner that when the trip bar 46 is depressed the valve 48 is opened and the electrical switch 50 is closed. Mounted on the left hand end of the carriage 18, supported thereby, and movable therewith is an electrical motor 44 suitably connected through the switch 50 to a source of electrical power (not shown) having a suitable capacity for operating the motor 44. A flexible drive element such as a chain 52 is suitably trained about a sprocket on the motor 44 and sprockets on the shafts 31 and 38 so that when the electrical motor 44 is energized the shafts 31 and 38 will be rotated by the chain 52.

Suitable wheel (cleaning) brushes 54 are suitably mounted above the outer ends of the four rollers, respectively, in any well known manner such that they engage the tires of a vehicle such as by being axially slideable with respect to the rollers by the action of fluid operated cylinders suitably connected to the valve 48 by fluid conducting tubes. Water and detergent solution are suitably supplied in any well known manner to cooperate with the brushes 54 in the cleaning operation.

A third shaft 56 is also rotatably mounted on the carriage 18 rearwardly spaced from, and parallel to the roller 40 and being of a length only slightly greater than the length of the roller 40. Shaft 56 has rearwardly extending levers, 58 at its right hand end and 60 at the left hand end rigidly fixed thereto. The lever 58 is suitably pivotably connected to the piston rod of a fluid operated cylinder 62 which is in turn suitably pivotably mounted on a bracket extending upwardly from the rearward longitudinal member 20. Cylinder 62 is connected to valve 48 so that when pressure fluid is supplied at its bracket end upon the opening of the valve 48, the piston rod of the cylinder 62 causes the lever 58 to move downward rotating the shaft 56 in a clock-wise direction as viewed in FIG. 1. It is to be noted that the valve 48 is of the type which, when closed to the passage of pressure fluid therethrough from a source of such pressure fluid to which it is connected, will, in the closed position, allow free flow of the pressure fluid from the cylinders attached thereto, down to atmospheric pressure. All of the cylinders attached to the valve 48 are of a suitable type which, after being extended by the admission of pressure fluid will, upon release of the pressure fluid, return to their original contracted condition.

The lever 60 on the left hand end of the shaft 56 is provided with a pin 64 which is selectively engageable with a hook type latching member 66 pivotably mounted on the rearward longitudinal member 20. Latching member 66 extends rearwardly from member 20 into a hook portion 67 and has a spring 68 biasing the rearwardly extending hook portion 67 in an upward direction. Rotation of the lever 60 in a clock-wise direction as viewed in FIG. 1 will move the hook portion of the latching member 66 in a downward direction. Upon release of pressure in the cylinder 62 the shaft 56 is rotated in a counter clock-wise direction and allows the hook portion 67 to be biased upwardly by the spring 68. Rigidly mounted on the shaft 56 intermediate the levers 58 and 60 is a pair of forwardly extending bracket members 70 provided with suitable bearings to rotatably support an elongated cylindrical entrance roller 72 rearwardly and upwardly spaced from but parallel to the roller 40 and positionable by actuation of the cylinder 62 so that when the rod member of the cylinder 62 is fully retracted the entrance roller 72 is at substantially the same height as the roller 40. When the cylinder 62 is fully extended the roller 72 is substantially above the roller 40 to maintain the positioning of an automobile wheel on the rollers 40 and 32 while the wheel washer is in operation. It is to be noted that the latching member 66 is so located that when the carriage 19 is in its rearmost position the hook portion 67 of the latching member 66 is underneath and engageable with the bottom edge 21 of the rearward longitudinal member 74 of the frame 12 after a small amount of forward movement of the carriage 19. Energization of the cylinder 62 disengages the hook portion of the latching member 66 from the longitudinal member 74 allowing the carriage 19 to move forward as hereinafter described.

The pit 13 has a rearwardly extending portion 13' with a rearwardly extending portion 12' of the frame 12 rigidly secured therein. Suitably, pivotally secured to the frame portion 12' is a forwardly and horizontally extending fluid actuating cylinder 76 having its rod end (not shown) suitably connected to the carriage 19 so that extension of the rod member of the cylinder 76 will move the carriage 19 in a forward direction while full or substantially full retraction of the rod member of the cylinder 76 will move the carriage 19 in a rearward direction to effect engagement of the latching member 66 with the longitudinal member 74 as hereinabove recited.

Mounted on the forward edge of the rearward right hand floor plate 28 is a treadle member 80 suitably mounted and suitably connected so that the passage of an automobile wheel across the right hand rearward floor plate 28 over the treadle 80 into the tread plate 30 associated therewith will effect the opening of a valve 82 to allow pressure fluid to flow therethough. The valve 82 is connected on one side to a source of pressure fluid by suitable fluid conducting tubular members and on its other side the valve 82 is connected to a triple valve 84 likewise suitably connected to a source of pressure fluid on one side and at two other points connected to the bracket end and rod end, respectively, of the cylinder 76. At the rearward edge of the right hand forward floor plate 28 a suitably mounted exit treadle 86 is similarly connected to a valve 88 also suitably supplied with pressure fluid and suitably connected to the triple valve 84 so that when the valve 88 is opened by the passage of an automobile wheel across the treadle 86 the valve 84 will be operated into a condition in which it supplies pressure fluid to the rod end of the cylinder 76 causing the retraction of the rod member of the cylinder 76 to move the carriage 19 in a rearward direction while activation of the treadle 80 changes the condition of the triple valve 84 into that wherein the valve 84 supplies pressure fluid to the bracket end of the cylinder 76 to cause extension of the rod member thereof.

For the sake of clarity of illustration, and in view of the well known use of fluid lines and valves having the capability of functioning as heretofore described, such lines and the details of such valves have not been illustrated.

Pivotally mounted on the carriage slightly forward of the roller 32 and rotatable about its forward edge is a tread member 90 having at its rearward edge an exit stop roller or bumper 92 supported in a raised position by a cam wheel 94 (see FIG. 2) pivotally mounted on bracket 95 extending downwardly from the underside of the tread 90 and traveling along an elongated cam member 96 having its rearward portion substantially horizontal and its forward portion slanting downwardly so that the exit stop bumper 92 is held in a raised position throughout travel of the carriage 19 from its rearmost position to a point somewhat forward of the position shown in FIG. 1 after which the cam wheel 94 traveling along the downward sloped portion of the cam member 96 allows the exit stop bumper 92 to be gradually lowered until at some point before the carriage 19 reaches its extreme forward position, the tread 90 becomes coplanar with the tread plate 30 adjacent thereto. Upon such lowering of the bumper 92 with the automobile being moved forward by suitable means such as its own power, the wheel rolls out of its location on the rollers 32 and 40 and exits from the wheel washer 12 over the exit treadle 86 at the end of the wheel washing operation.

The cyclic operation of the wheel washer 10 of this invention begins with the carriage 19 in its rearmost position. With the entry of the front wheels of an automobile upon the floor plates 28 at the rearward side of the wheel washer 10 (to the right as seen in FIG. 1) forward progress of the wheels of the automobile propelled as above described, causes the right hand wheel to pass over the treadle 80 opening the valve 82 to supply pressure fluid to the valve 84 which operates to supply pressure fluid to the bracket end of the cylinder 76. The cylinder 76 begins to extend its rod member but after slight motion the hook portion 67 which is located rearwardly of member 74 is moved forwardly to engage the longitudinal member 74 to restrain further forward motion of the carriage 19. The valve 48 being closed the cylinder 62 is in a contracted condition so that the entrance roller 72 is in its lowered position and the wheel of the automobile can roll thereover into position on the rollers 32 and 40. Since the carriage is in its rearmost position the cam wheel 94 will be on the horizontal portion of cam 96 holding the exit stop bumper 92 in its raised position to keep the right hand wheel from progressing beyond its proper positioning on the rollers 32 and 40. When the right hand wheel has attained its position on the rollers 32 and 40 the left hand wheel will of course be in position on the rollers 33 and 42 and as a consequence will press down on the trip bar 46 opening the valve 48 which in turn pressurizes the bracket end of the cylinder 62 causing extension of the rod member thereof with consequent clock-wise rotation of the lever 58 and the shaft 56. Rotation of the shaft 56 applies downward motion to the pin 64 which unhooks the latch member 66 from the longitudinal member 74 allowing the rod member of the cylinder 76 to continue forward movement of the carriage 19. It should be particularly noted that entrance of the right hand wheel across the entrance treadle 80 pre-pressurizes the bracket end of the cylinder 76 so that as soon as the trip bar 46 is depressed only a small motion of the lever 58 is necessary to start the carriage moving with no necessity to wait for pressurizing of the cylinder 76.

As soon as depression of the trip bar 46 opens the valve 48 the brush actuating cylinders bring the brushes in against the wheels and the motor 44 is energized through the closing of the switch 50 by the depression of the trip bar 46 to begin the rotation of the rollers 32, 40, 33 and 42 so that the wheels are rotated against the brushes supplied, as before mentioned, with water and detergent to effect the wheel washing as desired. When the cylinder 62 was energized by opening of the valve 48, extension of the rod end of the cylinder 62 not only depressed the latch member 66 but raised the entrance roller 72 into a position well above the roller 40 to overcome any tendency of the wheel to roll off the rollers 32 and 40 in a rearward direction when the carriage begins to move forwardly.

The carriage continues to move in a forward direction as actuated by extension of the rod member of the cylinder 76 until the cam wheel 94 traveling on the sloping part of the cam member 96 drops the exit stop bumper 92 down to a level sufficiently low that the wheel positioned on the rollers 32 and 40 can roll out of position over the exit stop bumper 92 and across the treadle plate 86 opening the valve 88 which conditions the valve 84 to release the pressure on the bracket end of the cylinder 76 and supply pressure fluid to the rod end of the cylinder 76 to begin retraction of the rod member into the cylinder 76 to return the carriage to the start position with the rearward longitudinal member 20 positioned under the entrance treadle 80. When the wheel on the left hand side of the car leaves the rollers 33 and 42 the trip bar 46 is released from its depressed position and closes the valve 48 and turns off the electrical switch 50 so that the motor 44 stops, the brush cylinders retract the brushes from contact with the wheels and the cylinder 62 retracts its rod member lowering the entrance roller 72 and allowing the spring 68 to bias the hook portion 67 of the latch member 66 into position such that it can engage the longitudinal member 74 thus returning the wheel washer 10 to the condition of readiness for the start of the next cycle of operation.

In an automatic car washing operation such as that set forth in my copending application, Ser. No. 433,884 filed Feb. 19, 1965 the forward motion of the carriage is synchronized with the conveyor speed and the return motion is much more rapid so that even with short wheelbase automobiles the carriage 19 is returned to the starting position before the rear wheels touch the entrance treadle 80.

With the present day tire sizes it is advantageous that the rollers 32, 40 and 33, 42 be four to six inches in diameter and spaced a distance of six to eight and one half inches from each other in order to obtain proper supporting of the wheel without lowering the vehicle wheels to any substantial degree below the surface of the entrance area.

A preferred embodiment of this invention having been described and illustrated it is to be realized that modifications and variations in the device can be made without departing from the principles of this invention. It is therefore respectfully requested that the claims appended hereto be interpreted as broadly as possible, limited only by the prior art.

What is claimed:

1. A method of simultaneously washing oppositely spaced wheels of a vehicle comprising, actuating a carriage for movement from a starting position by passage of at least one of a pair of oppositely spaced wheels of a vehicle over an entrance area forwardly adjacent said carriage, locating and supporting the lowermost portions of said spaced wheels between pairs of spaced rollers respectively, driving at least one of said rollers of each of said pair of rollers to cause rotation of each of said spaced wheels while simultaneously moving said carriage away from said entrance area and towards an exit area, cleaning the outwardly facing surfaces of said spaced wheels during said movement of said carriage, positioning restraining means at least forwardly of at least one of said spaced wheels during said movement of said carriage, removing said forwardly located of said retaining means as said carriage approaches said exit area, moving said spaced wheels forwardly from said rollers onto and over said exit area, and returning said carriage to said starting position.

2. The method as defined in claim 1 in which said actuating force is applied to said carriage prior to movement thereof.

3. The method as defined in claim 1 in which said forwardly located retaining means is gradually lowered to a position to permit easy egress of the spaced wheels from the rollers.

4. Apparatus for washing wheels of an automobile vehicle comprising, a movably supported carriage, actuatable means for reciprocating said carriage between spaced entrance and exit areas, cleaning means carried by said carriage spaced laterally with respect to the path of movement of said carriage a distance to permit the wheels of a vehicle to be located therebetween, roller means carried by said carriage located inwardly adjacent said cleaning means to support a pair of spaced vehicle wheels respectively, control means for actuating said actuatable means, a stationary member, said carriage having restraining means engageable with said stationary member upon movement of said carriage after actuation of said actuatable means to limit the initial movement of said carriage with respect to said entrance area, and other control means for releasing said restraining means to permit subsequent movement of said carriage.

5. Apparatus as defined in claim 4 in which at least a portion of said other control means travels with said carriage.

6. The method as defined in claim 1 in which restrainment of said carriage from movement occurs until after said locating of said spaced wheels has occurred.

7. Apparatus for washing wheels of an automobile vehicle comprising: a movably support carriage, actuatable means for reciprocating said carriage between spaced entrance and exit areas, cleaning means carried by said carriage spaced laterally with respect to the path of movement of said carriage a distance to permit the wheels of a vehicle to be located therebetween, roller means carried by said carriage located inwardly adjacent said cleaning means to support a pair of spaced vehicle wheels respectively, said roller means comprising at least one pair of elongated rollers extending laterally of and spaced in the direction of said path, said at least one pair of rollers being located adjacent each other a distance such that vehicle tires are supported therebetween without lowering said vehicle wheels to any substantial degree below the surface of said entrance area, and restraining means carried by said carriage at least forwardly of said at least one pair of rollers, and said restraining means being movable transversely with respect to said path to prevent the wheels of a vehicle from movement off of said at least one pair of roller during at least the major portion of the forward movement of said carriage.

8. Apparatus as defined in claim 7 in which the roller of said at least one pair of rollers are from 4 to 6 inches in diameter and the rotation axes thereof are parallel to each other in the same horizontal plane and spaced a distance of 6 to 8½ inches from each other.

9. Apparatus as defined in claim 7 in which restraining means is positioned by means of a cam.

References Cited
UNITED STATES PATENTS

| | | |
|---|---|---|
| 2,490,921 | 12/1949 | Rousseau. |
| 2,837,759 | 6/1958 | Haverberg. |
| 2,957,195 | 10/1960 | Almond. |
| 3,058,133 | 10/1962 | Haverberg. |

EDWARD L. ROBERTS, *Primary Examiner.*

U.S. Cl. X.R.

15—21; 134—32